(12) United States Patent
Makwana et al.

(10) Patent No.: US 7,679,326 B2
(45) Date of Patent: Mar. 16, 2010

(54) COMPUTER WITH MULTIPLE REMOVABLE BATTERY PACKS

(75) Inventors: Bobbykin T. Makwana, Houston, TX (US); Paul J. Doczy, Houston, TX (US); Memphle-Zhihong Yin, Houston, TX (US); John A. Wozniak, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 517 days.

(21) Appl. No.: 11/403,380

(22) Filed: Apr. 13, 2006

(65) Prior Publication Data

US 2007/0247114 A1 Oct. 25, 2007

(51) Int. Cl.
*H02J 7/00* (2006.01)
(52) U.S. Cl. .................. 320/128; 320/107; 429/96; 429/99; 361/679.55
(58) Field of Classification Search .......... 320/112, 320/116, 124, 107, 128, 108, 110, 111, 113–115; 307/48; 429/96, 97, 99, 100; 361/679.55
See application file for complete search history.

(56) References Cited

U.S. PATENT DOCUMENTS 5,130,892 A * 7/1992 Satou ................ 361/679.55
5,251,105 A * 10/1993 Kobayashi et al. ........ 361/683
5,477,123 A * 12/1995 Allen et al. ............... 320/124
5,563,493 A * 10/1996 Matsuda et al. .......... 320/124
5,621,301 A * 4/1997 Allen et al. ............... 320/124
5,629,602 A * 5/1997 Makino .................... 307/66
6,563,702 B1 * 5/2003 Shin et al. ............ 361/679.41
7,183,744 B2 * 2/2007 Fan et al. .................. 320/112
2006/0133021 A1 * 6/2006 Fan .......................... 361/683

* cited by examiner

*Primary Examiner*—Edward Tso
*Assistant Examiner*—Arun Williams (57) ABSTRACT

A computer comprises a computer chassis, a communication connector provided on a surface of the chassis to mate the computer with a docking station, and first and second battery packs. The first battery pack is adapted to mate to the surface of the chassis. The first battery pack has a shape that defines a volume in which at least a portion of the docking station can be inserted to mate to the communication connector. Further, the first battery pack has a first battery pack connector. The second battery pack has a shape that corresponds to the volume defined by the first battery pack's shape. The second battery pack has a second battery connector that mates to the first battery connector when the second battery pack is mated to the first battery pack.

17 Claims, 5 Drawing Sheets

COMPUTER WITH MULTIPLE REMOVABLE BATTERY PACKS

BACKGROUND

Portable electronic devices, such as computers, operate from a battery when not connected to an alternating current (AC) power source. All else being equal, it is desirable for the battery to last for longer, rather than shorter, periods of time. However, often designing an electronic device to accommodate an additional battery undesirably increases the size of the electronic device.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

As used in this disclosure, the term "battery pack" refers to a collection of one or more cells typically packaged in a single enclosure. The enclosure includes a pair of terminals (a positive terminal and a negative terminal). The cells inside the pack are electrically coupled together (e.g., connected in series).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
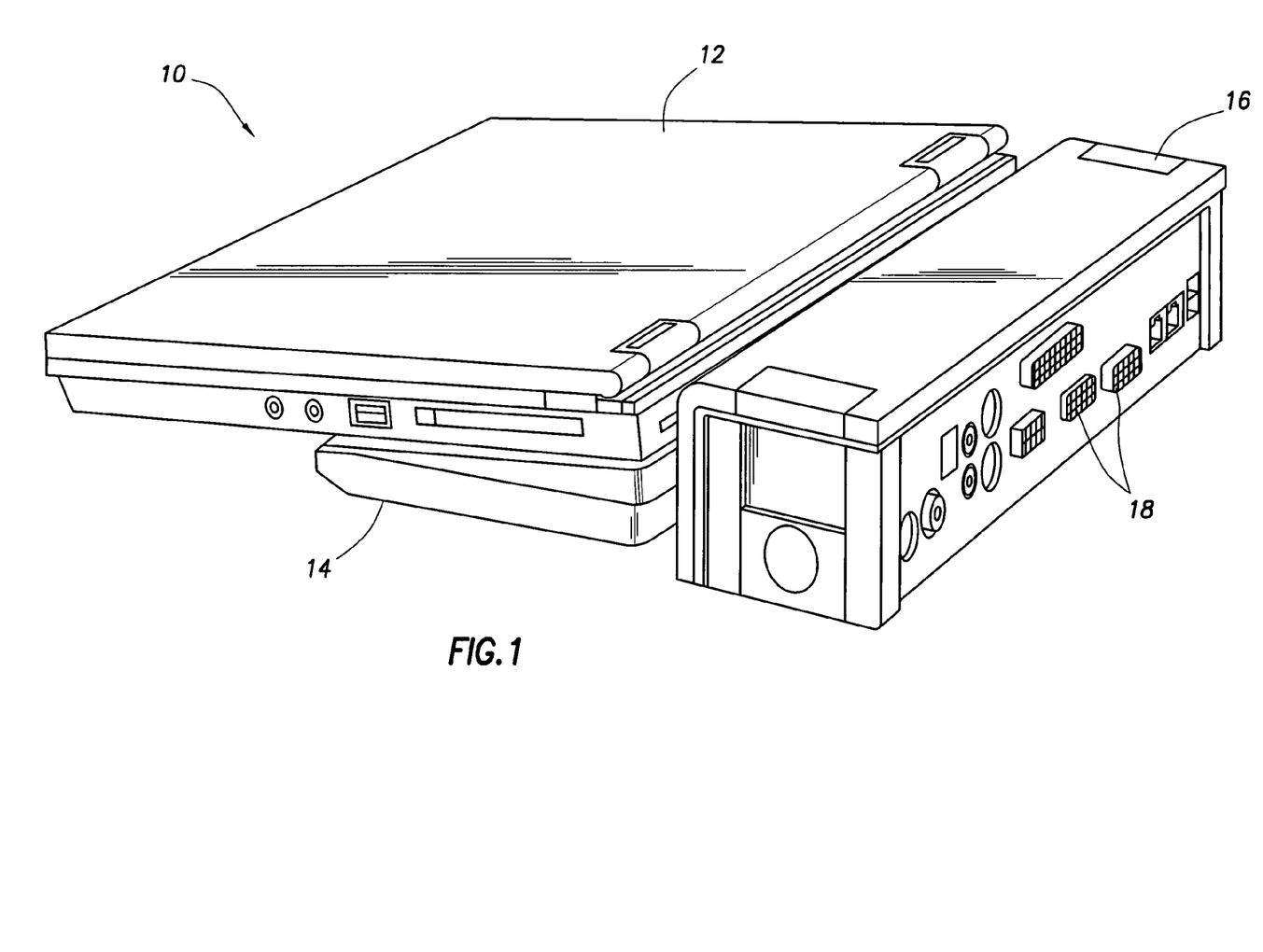
FIG. 1 shows a portable computer system mated to a docking station in accordance with embodiments of the invention.

FIG. 1 illustrates an electronic device 10 in accordance with embodiments of the invention. The device 10 shown in FIG. 1 and described herein comprises a computer system. In other embodiments of the invention, the electronic device 10 comprises a device other than a computer system.

The computer system 10 comprises a portable computer 12 (e.g., notebook, laptop, tablet, etc.), a battery pack 14 mated to a bottom surface of the computer 12, and a docking station 16 to which the computer can mate. The docking station 16 comprises one or more connectors 18 on a rear surface to permit the computer 12 to be coupled to any of a variety of peripheral devices. Examples of such peripheral devices includes a display, a mouse, a keyboard, speakers, a network connection, etc.

Figure 2:
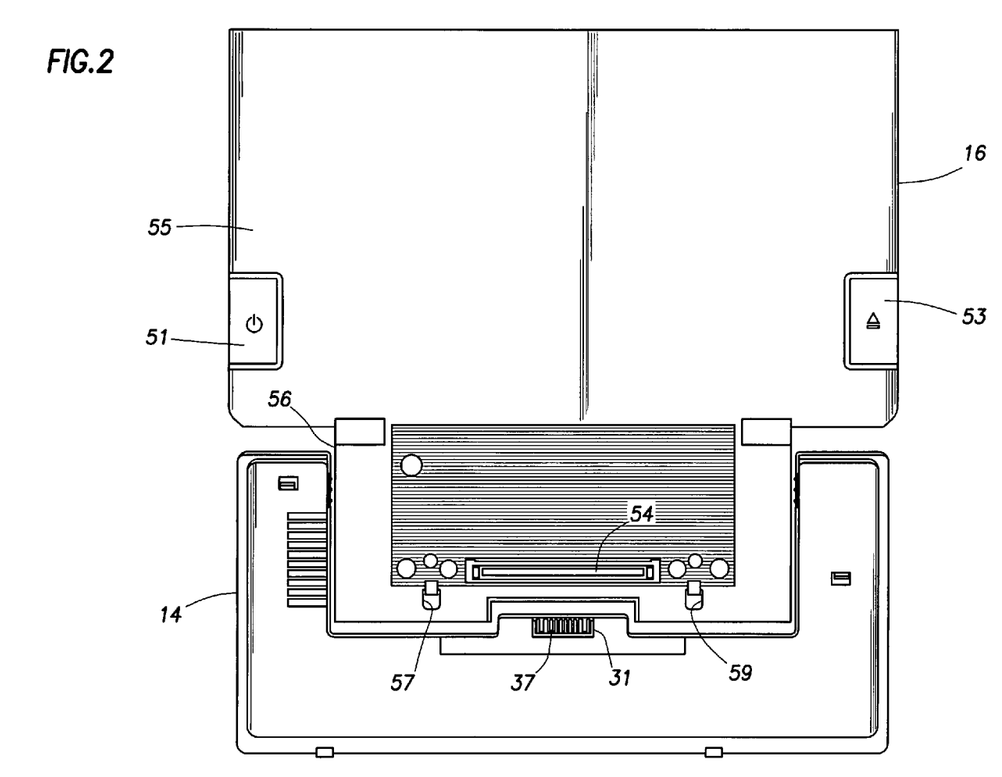
FIG. 2 shows a top view of the docking station of FIG. 1 and battery pack in accordance with embodiments of the invention.

FIG. 2 illustrates a top view of the docking station 16 and battery pack 14—the computer 12 is not shown in FIG. 2. The docking station comprises a wiring assembly 55 and protruding member 56. In some embodiments, the wiring assembly 55 is generally rectangular in shape as shown in FIG. 2 and comprises a power switch 51, a computer eject switch 53 (to cause the computer 12 to be ejected from the docking station), and the connectors 18 (shown in FIG. 1). The docking station 16 can be connected to an AC power source (e.g., wall outlet) to provide power to a docked computer 12 for operating the computer and recharging any batteries associated with the computer. At least one of the connectors 18 at the rear of the docking station 16 may comprise a network connector to couple the computer 12 to a network.

The protruding member 56 protrudes away from the wiring assembly 55 as shown in the exemplary embodiment of FIG. 2. The protruding member 56 comprises a communication connector 54 and one or more alignment holes 57 and 59. The communication connector 54 mates to a corresponding communication connector on a bottom surface of the computer 12 when the computer is mated to the docking station 16. Electrical connectivity between the connectors 18 and the rear of the docking station (and thus any connected peripheral devices or network) is established with the computer 12 via the communication connector 54. The alignment holes 57, 59 receive alignment pins protruding from the bottom surface of the computer 12 to assist in docking the computer to the docking station's protruding member 56.

FIG. 2 also shows the battery pack 14 from FIG. 1. The battery pack 14 mates to a bottom surface of the computer 12. Accordingly, the surface of the battery pack shown in FIG. 2 is the surface that would abut the computer's bottom surface. As shown in the exemplary embodiment of FIG. 2, the battery pack 14 has a shape that defines a volume of space that the docking station's protruding member 56 occupies when the computer 12 is docked. In the particular embodiment of FIG. 2, the battery pack 14 is generally C-shaped, although other shapes are possible (e.g., annular, non-geometric), and includes a tab protrusion 31 on which a battery connector 37 is provided. The battery connector 37 mates to a corresponding connector on the computer 12. Through connector 37, the battery pack 14 provides direct current (DC) power to the computer's components (e.g., a processor, memory, etc.) and the battery pack can be charged.

Figure 3:
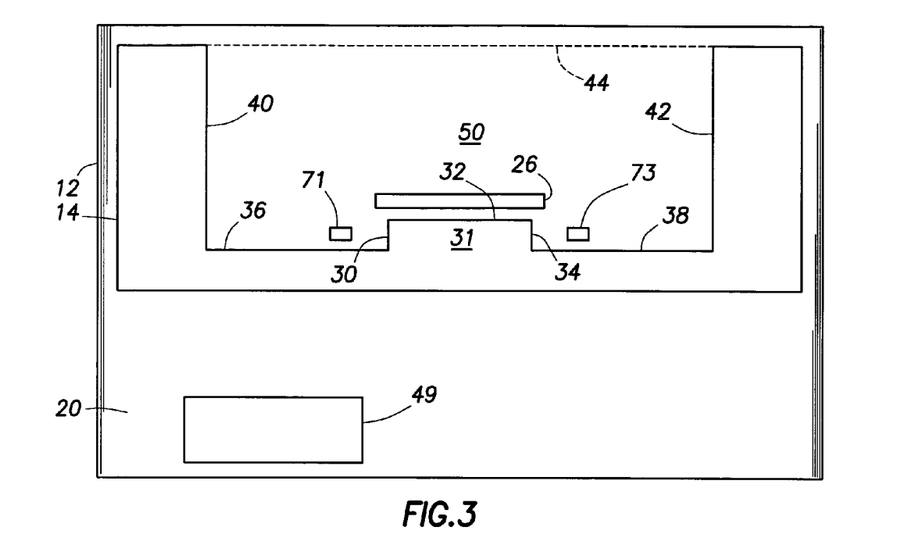
FIG. 3 illustrates a bottom surface of the portable computer system of FIG. 1 to which a battery pack is mated in accordance with embodiments of the invention.

FIG. 3 shows a bottom view of the computer 12. As shown, the battery pack 14 is mated to a bottom surface 20 of the computer via connector 37, which is hidden in the view of FIG. 3. A communication connector 26 is also provided on the bottom surface 20 of the computer to which the corresponding communication connector 54 of the docking station 16 mates when the computer 12 is docked to the docking station 16. A pair of alignment pins 71 and 73 are also shown in FIG. 3 and function to be inserted into the docking station's alignment holes 57, 59 discussed previously (FIG. 2).

The computer 12 may include a primary battery pack that resides in compartment 49. If the computer 12 has a primary battery pack, the battery pack 14 provides additional battery power beyond that which the primary pack can provide.

The battery pack 14 defines a volume of space 50 into which at least a portion of the docking station 16 is inserted (e.g., the protruding member 56). The volume of space 50 is defined in at least some embodiments by edges 30, 32, 34, 36, 38, 40, and 42 of the battery pack 14 as well as imaginary line 44 as shown. In the embodiment shown in FIG. 3, the battery pack 14 is generally C-shaped and defines a corresponding volume of space 50 that can be used to accommodate the docking station's protruding member 56.

Figure 4:
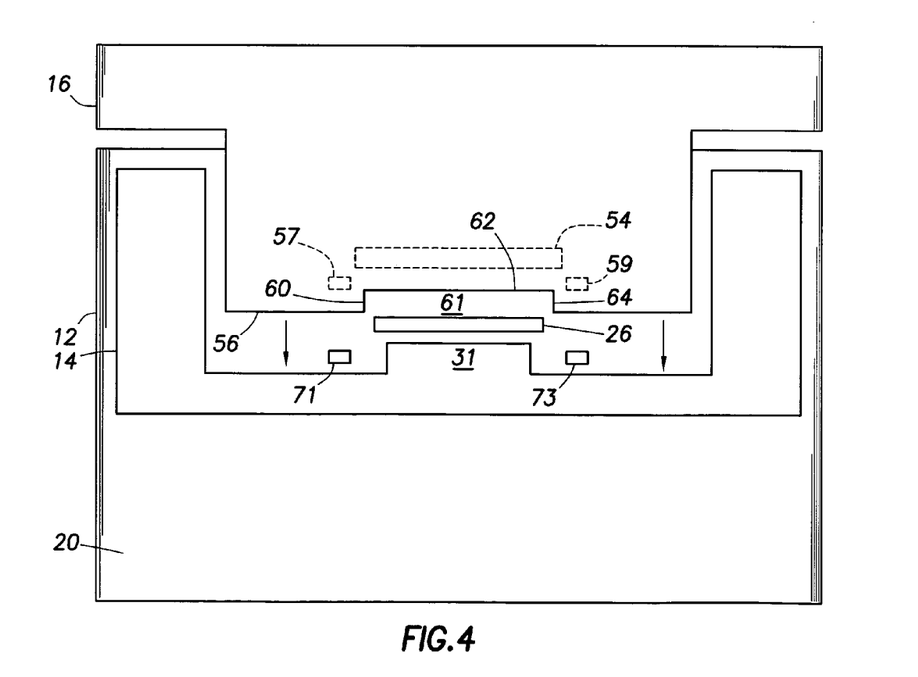
FIG. 4 illustrates the physical interaction between the battery pack and the docking station in accordance with embodiments of the invention.

FIG. 4 shows how the protruding member fits within the volume of space 50 defined by the battery pack 14. The protruding member 56 comprises a notch area 61 that corresponds in shape to tab 31 of the battery pack 14. The notch area 61 is defined by surfaces 60, 62, and 64 as shown. The communication connector 54 and alignment holes 57, 59 of the protruding member 56 are shown in phantom as those components are on the side of the protruding member that abuts the bottom surface 20 of the computer 12 and thus would not ordinarily be seen in the view of FIG. 4.

Figure 5:
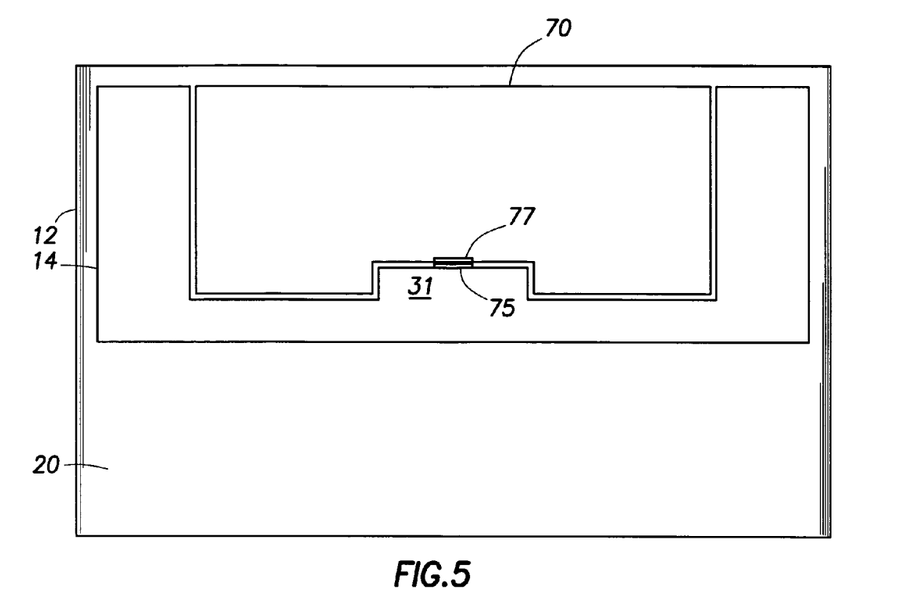
FIG. 5 illustrates the inclusion of an additional battery pack in accordance with embodiments of the invention.

FIG. 5 shows yet an additional battery pack 70 that has a size and shape that generally corresponds to the volume of space 50 defined by the battery pack 14. At least a portion, or substantially all, of the battery pack 70 fits within the volume of space 50 that is provided already. In some embodiments, a portion of the battery pack 70 can extend beyond the bounds of space 50. The battery pack 70 can mate to the portable computer 12 without a substantial, or any, increase in overall exterior dimensions of the computer 12 to account for such battery pack. The volume of space 50 thus can accommodate the protruding member 56 of the docking station 16 when the computer 12 is docked or an extra battery pack 70 when the computer is not docked.

Referring still to FIG. 5, each battery pack 14, 70 is provided with a battery connector. Battery pack 14 comprises connector 75 and battery pack 70 comprises connector 77. The batteries 14, 70 electrically couple to one another via connectors 75, 77. Connector 75 is wired through the battery pack 14 to the battery connector 37 (FIG. 2). Through connectors 75 and 37 of the battery pack 14, battery pack 70 can provide DC power to the computer and be charged.

Figure 6:
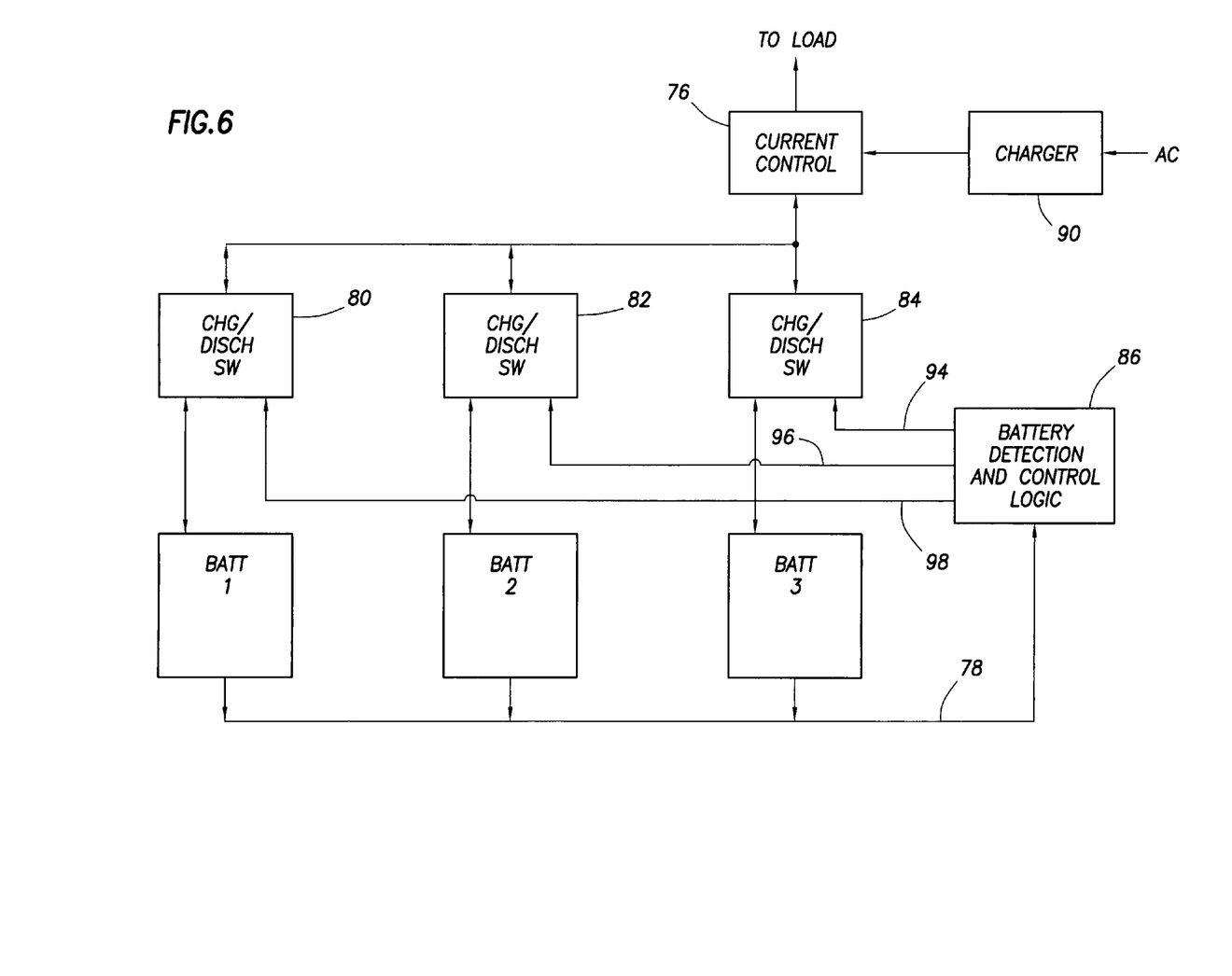
FIG. 6 shows a computer system circuit schematic in accordance with embodiments of the invention.

FIG. 6 shows at least a partial electrical schematic of the computer 12. Each of three batteries (which can be battery packs), labeled as Battery 1, Battery 2, and Battery 3, couples to a respective charge/discharge switch. Battery 1 couples to charge/discharge switch 80, while Batteries 2 and 3 couple to charge/discharge switches 82 and 84, respectively. Computer 12 also comprises a charger 90 that receives AC power (or DC power derived from an AC power source) and current that is provided to a current control 76. The current control 76 couples to each of the charge/discharge switches 80-84 and also provides power for one or more loads (e.g., a processor, memory, etc.). An example will be given below in which battery packs 14 and 70 correspond to Batteries 2 and 3, respectively. In that example, the computer's primary battery pack corresponds to Battery 1.

A battery detection and control logic 86 is also provided that couples to each of the batteries via a communication link 78. In at least one embodiment, the communication link 78 comprises a Low Pin Count (LPC) bus. Via communication link 78, the battery detection and control logic 78 is able to determine which, if any, batteries are installed in the computer 12. The battery detection and control logic 78 also asserts control signals 94, 96, and 98 to the charge/discharge switches 80, 82, and 84, respectively.

If the computer 12 is connected to a source of AC power, current from the charger 90 is routed through the current control 76 to the load and also is provided to charge current to a battery pack that is need of being charged. If, however, the computer 12 is not connected to an AC power source, one battery pack at a time is used to power the load. The flow of current from the charge to the load and to the batteries and from the batteries to the load is routed through and controlled by the current control 76, which informed in accordance with any suitable mechanism, such as a signal from the charger, as to whether an AC power source is present.

Referring still to FIG. 6, the battery detection and control logic 86, which may be implemented in hardware, firmware, or a combination thereof, determines which battery pack(s), if any, are installed in the computer 12. The battery detection and control logic 86 further implements a charge protocol and a discharge protocol.

The charge protocol specifies a priority as to the order of which the various batteries are to be charged in the event multiple battery packs are not fully charged. According to the predetermined priority, as needed, one battery pack at a time is charged by the charger 90. In an embodiment in which three batteries may be installed in the computer 12, one of the three batteries is given highest priority, another battery pack is given the next highest priority, and the third battery pack is given the lowest priority in terms of charging the batteries. For example, in FIG. 6, Battery 1 may be the highest charge priority and Batteries 2 and 3 may have the middle and lowest priorities, respectively. As such, if Battery 1 is installed in the computer and is not fully charged, Battery 1 will be charged before any other batteries are charged. Battery 2, if installed and in need of being charged, will be charged before Battery 3. Of course, if only one battery pack is installed in the system, that battery pack will be charged without regard to the hierarchy. If only Batteries 2 and 3 are installed (not Battery 1), and both such batteries are not fully charged, Battery 2 will be charged before Battery 3 is charged. If only Batteries 2 and 3 are installed, but Battery 2 is already fully charged, Battery 3 will be charged. In the preceding example, Battery 1 may comprise the computer's primary battery pack, while Batteries 2 and 3 may comprise battery packs 14 and 70, respectively. As such, the primary pack is given highest charge priority followed by the battery packs 14 and then 70. Thus, to the extent multiple batteries are installed in the computer and are in need of being charged, the battery detection and control logic 86 implements a predetermined priority as to the order at which the batteries are charged. Of course, a different charging priority may be assigned.

The battery detection and control logic 86 implements the charge hierarchy by asserting the various control signals 94-98 to the various charge/discharge switches 80-84. Via the corresponding control signal 94-98, the battery detection and control logic 86 is able to cause the respective charge/discharge switch 80-84 to permit charge current to flow from the charger 90, via current control 76, into the corresponding battery pack. While one battery pack is charging, the battery detection and control logic 86 asserts the control signals for the other charge/discharge switches to a state to cause those charge/discharge switches to prevent charge current from flowing in their respective batteries.

In accordance with embodiments of the invention, if the computer 12 is operating from battery power and multiple batteries are installed in the computer, one battery pack at a time is used to power the load. Once that battery pack becomes discharged or reaches a minimum predetermined remaining capacity threshold, another battery pack is used instead to power the load. Accordingly, the battery detection and control logic 86 implements a priority for discharging the batteries. In an embodiment in which three batteries may be installed in the computer 12, one of the three batteries is given highest priority, another battery pack is given the next highest priority, and the third battery pack is given the lowest priority in terms of discharging the batteries. For example, in FIG. 6, Battery 2 may have the highest discharge priority and Batteries 3 and 1 may have the middle and lowest discharge priorities, respectively. As such, if Battery 2 is installed in the computer, Battery 2 will be used to power the load before any other batteries are discharged. Battery 3, if installed, will be discharged before Battery 1. Of course, if only one battery pack is installed in the system, that battery pack will be discharged without regard to the priority. If only Batteries 3 and 1 are installed (not Battery 2), Battery 3 will be discharged before Battery 1 is discharged. In the preceding example, Battery 2 may comprise battery pack 14, while Battery 3 may comprise battery pack 70 and Battery 1 may comprise the computer's primary battery pack. As such, the battery pack 14 is given highest discharge priority followed by the battery pack 14 and then the primary battery pack. Thus, to the extent multiple batteries are installed in the computer and the computer is configured to operate from battery power, the battery detection and control logic 86 implements a predetermined priority as to the order at which batteries are discharged.

The battery detection and control logic 86 determines which batteries are installed in the computer and the charge remaining in each battery pack, for example, by reading capacity information from each battery pack over communication link 78. The battery detection and control logic 86 implements the discharge hierarchy by asserting the various control signals 94-98 to the various charge/discharge switches 80-84. Via the corresponding control signal 94-98, the battery detection and control logic 86 is able to cause the respective charge/discharge switch 80-84 to permit current to flow from a battery pack to the load. While one battery pack is discharging to the load, the battery detection and control logic 86 asserts the control signals for the other charge/discharge switches to a state to cause those charge/discharge switches to prevent discharge current from the active battery pack to flow into the non-active batteries.

Thus, in accordance with at least some embodiments, a method comprises undocking the computer 12 from docking station 16 where at least a portion of the docking station 16 was inserted into the volume (i.e., space 50) defined by battery pack 14. The method further comprises installing a second battery pack (pack 70) on the computer so that at least a portion of the battery pack 70 is installed into space 50. Further, the method comprises removing battery pack 70 from space 50 and docking the computer 12 to the docking station 16 such that at least said portion of the docking station is inserted into space 50. The charge and discharge techniques described herein enable charging and discharging the battery packs sequentially.

Figure 7:
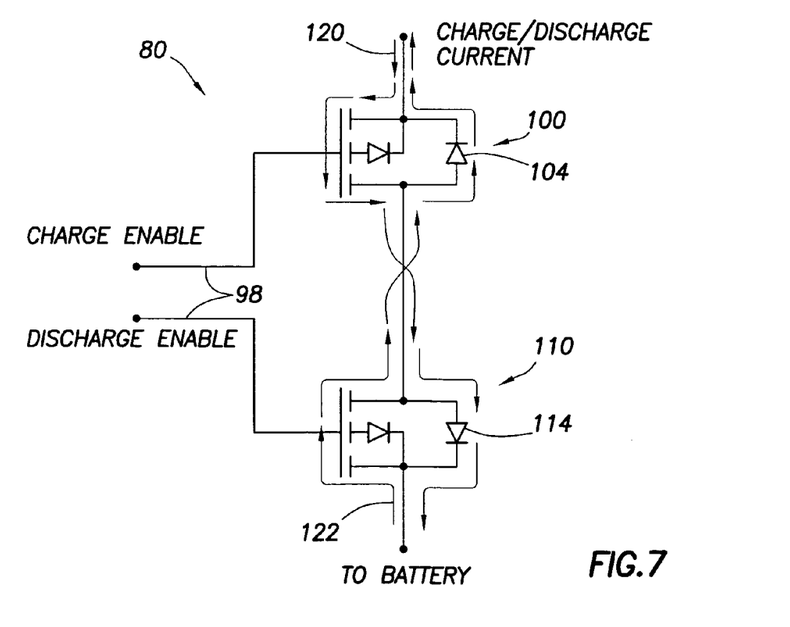
FIG. 7 shows an embodiment of a charge/discharge switch.

FIG. 7 illustrates an embodiment of charge/discharge switch 80. The same implementation may be used for the other charge/discharge switches 82 and 84. Charge/discharge switch 80 comprises metal oxide semiconductor field effect transistors (MOSFETs) 100 and 110. Control signal 98 is implemented in this embodiment as a pair of control signals with one control signal coupled to the gate of each MOSFET as shown. Each MOSFET 100, 110 comprises a body drain diode. MOSFET 100 comprises body drain diode 104 and MOSFET 110 comprises body drain diode 114. Each body drain diode 104, 114 is capable of passing current in one direction (from anode to cathode through the diode) even if the associated MOSFET is off. Each MOSFET 104, 114 in the embodiment of FIG. 7 comprises a p-channel device which is turned on by a low enable signal 98. A high enable signal causes the respective MOSFET to be off. In other embodiments, the MOSFET 100, 110 comprise n-channel MOSFETs and in yet other embodiments, one of MOSFETs 100, 110 comprise an n-channel device and the MOSFET comprises a p-channel device. Transistors other than MOSFETs can be used as well. MOSFET 100 comprises a charge MOSFET and MOSFET 110 comprises a discharge MOSFET which can be used as explained below.

If a particular battery pack is being charged or discharged, the enable signals 98 to the MOSFETs 100, 110 associated with the selected battery pack are asserted low to thereby turn on both MOSFETs. The flow path for charge current into the battery pack is denoted by reference numeral 120. Charge current flow path 120 comprises the charge MOSFET 120 (not including body drain diode 104) and the body drain diode 114 of discharge MOSFET 110. The flow path for discharge current from the battery pack is denoted by reference numeral 122. Discharge current flow path 122 comprises the discharge MOSFET 122 (not including body drain diode 114) and the body drain diode 104 of charge MOSFET 100.

When a particular battery pack is not selected for powering the load or to be charged (termed an "inactive" battery pack), both of the inactive battery pack's associated charge and discharge MOSFETs 100, 110 are turned off by, for example, asserting both enable signals 98 to a high state. The charge and discharge MOSFETs 110, 110 are used to block charge or discharge selectively to prevent various undesirable conditions such as over-charge or over-discharge conditions. For example, with the charge MOSFET 100 off and the body drain diode 104 oriented as shown in FIG. 7 (blocking current from flowing to the battery pack), charge current or current from an active battery pack cannot flow into the inactive battery pack, thereby preventing an over-charge condition. Similarly, with the discharge MOSFET 110 off and the body drain diode 114 oriented as shown in FIG. 7 (blocking current from flowing out of the battery pack), discharge current from the inactive battery pack cannot flow through discharge MOSFET 110 and thus cannot flow to the load or other batteries. Thus, by turning the discharge MOSFET 110, a battery pack that is substantially already depleted cannot be over-discharged.

The charge and discharge MOSFETs 100, 110 are controlled so as to enable smooth transitions when the role of active battery pack from one battery pack to another battery pack. For example, assume that Battery 1 (FIG. 6) is presently the active battery pack and, in accordance with discharge protocol, Battery 2, perhaps because Battery 1 is running low on charge, is now to become the active battery pack for discharging to the load. While Battery 1 is the active battery pack, both of Battery 1's charge and discharge MOSFETs 110, 110 are enabled and both of Battery 2's charge and discharge MOSFETs 110, 110 are disabled. In accordance with at least one embodiment, Battery 2 becomes the active battery pack as follows. The battery detection and control logic 86 forces the charge enable signal 98 to Battery 1's charge MOSFET 100 to a high state, thereby turning off Battery 1's charge MOSFET. As explained above, at this point no current can flow into Battery 1, but discharge current can continue to flow out of Battery 1 through body drain diode 104 of the disabled charge MOSFET 100. The battery detection and control logic 86 then forces the discharge enable signal 98 to Battery 2's discharge MOSFET 110 to a low state, thereby enabling Battery 2 to begin discharging current through its now-enabled discharge MOSFET 110 and the body drain diode 104 of its charge MOSFET 100. Subsequently, the battery detection and control logic 86 forces the discharge enable signal 98 to Battery 1's discharge MOSFET 110 to a high state, thereby precluding Battery 1 from discharging current to the load. At this point, both of Battery 1's charge and discharge MOSFET's 100, 110 are turned off and thus no charge current can flow into Battery 1 nor can Battery 1 discharge any current. The battery detection and control logic 86 also forces the charge enable signal 98 to Battery 2's charge MOSFET 100 to a low state to turn on Battery 2's charge MOSFET 100. At this, point Battery 2 is able to provide power to the load as well as receive charge current.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer, comprising:
   a chassis;
   a communication connector provided on a surface of said chassis to mate the computer with a docking station;
   a first battery pack adapted to mate to the surface of said chassis, said first battery pack having a shape that defines a volume into which at least a portion of said docking station can be inserted to mate to said communication connector, said first battery pack having a first battery pack connector; and
   a second battery pack having a shape that corresponds to said volume, said second battery pack having a second battery connector that mates to the first battery connector when the second battery pack is mated to the first battery pack, wherein at least a portion of said second battery pack fits within said volume.

2. The computer of claim 1 further comprising a third battery pack installed in said chassis.

3. The computer of claim 1 further comprising a charger and logic that causes the battery packs to be charged sequentially.

4. The computer of claim 3 wherein the packs are charged sequentially in accordance with a predetermined order.

5. The computer of claim 1 further comprising a charger and logic that causes the battery packs to be discharged sequentially.

6. The computer of claim 5 the packs are discharged sequentially in accordance with a predetermined order.

7. The computer of claim 1, further comprising a third battery pack and a plurality of charge/discharge circuits, each circuit coupled to a corresponding one of said first, second and third battery packs, each charge/discharge circuit selectively permitting its corresponding battery pack to be charged and discharged.

8. A method, comprising:
   undocking a computer from a docking station, at least a portion of the docking station inserted into a volume defined by a first battery pack mated to an outer surface of the computer; and
   installing a second battery pack in said computer so that at least a portion of said second battery pack is installed into said volume.

9. The method of claim 8 further comprising removing said second battery pack from said volume and docking said computer to said docking station such that at least said portion of the docking station is inserted into said volume.

10. The method of claim 8 further comprising connecting said computer to an alternating current source.

11. The method of claim 10 further comprising charging the first battery pack before charging the second battery pack.

12. The method of claim 8 further comprising charging the battery packs sequentially.

13. The method of claim 12 further comprising discharging the battery packs sequentially.

14. A method, comprising:
   removing a second battery pack from a computer, at least a portion of said second battery having been installed into a volume defined by a shape of a first battery pack already installed on said computer;
   docking the computer to a docking station, at least a portion of the docking station inserted into said volume defined by the shape of the first battery pack.

15. A computer, comprising:
   means for housing a processor;
   means for providing a first removable source of direct current (DC) power to said processor and for alternatively coupling to a docking station and to a second removable source of DC power.

16. The computer of claim 15 further means for providing a third removable source of DC power.

17. The computer of claim 16 further comprising means for charging and discharging the removable sources of DC power according to a predetermined priority.

* * * * *

UNITED STATES PATENT AND TRADEMARK OFFICE
CERTIFICATE OF CORRECTION

PATENT NO. : 7,679,326 B2
APPLICATION NO. : 11/403380
DATED : March 16, 2010
INVENTOR(S) : Bobbykin T. Makwana et al.

It is certified that error appears in the above-identified patent and that said Letters Patent is hereby corrected as shown below:

On the Title Page, Item (75), Inventors, line 3, delete "Memphle-Zhihong Yin" and insert -- Memphis-Zhihong Yin --, therefor.

In column 8, line 4, in Claim 6, before "the" insert -- wherein --.

In column 8, line 46, in Claim 16, before "means" insert -- comprising --.

Signed and Sealed this

Eighth Day of June, 2010

David J. Kappos
*Director of the United States Patent and Trademark Office*